Figure 1:
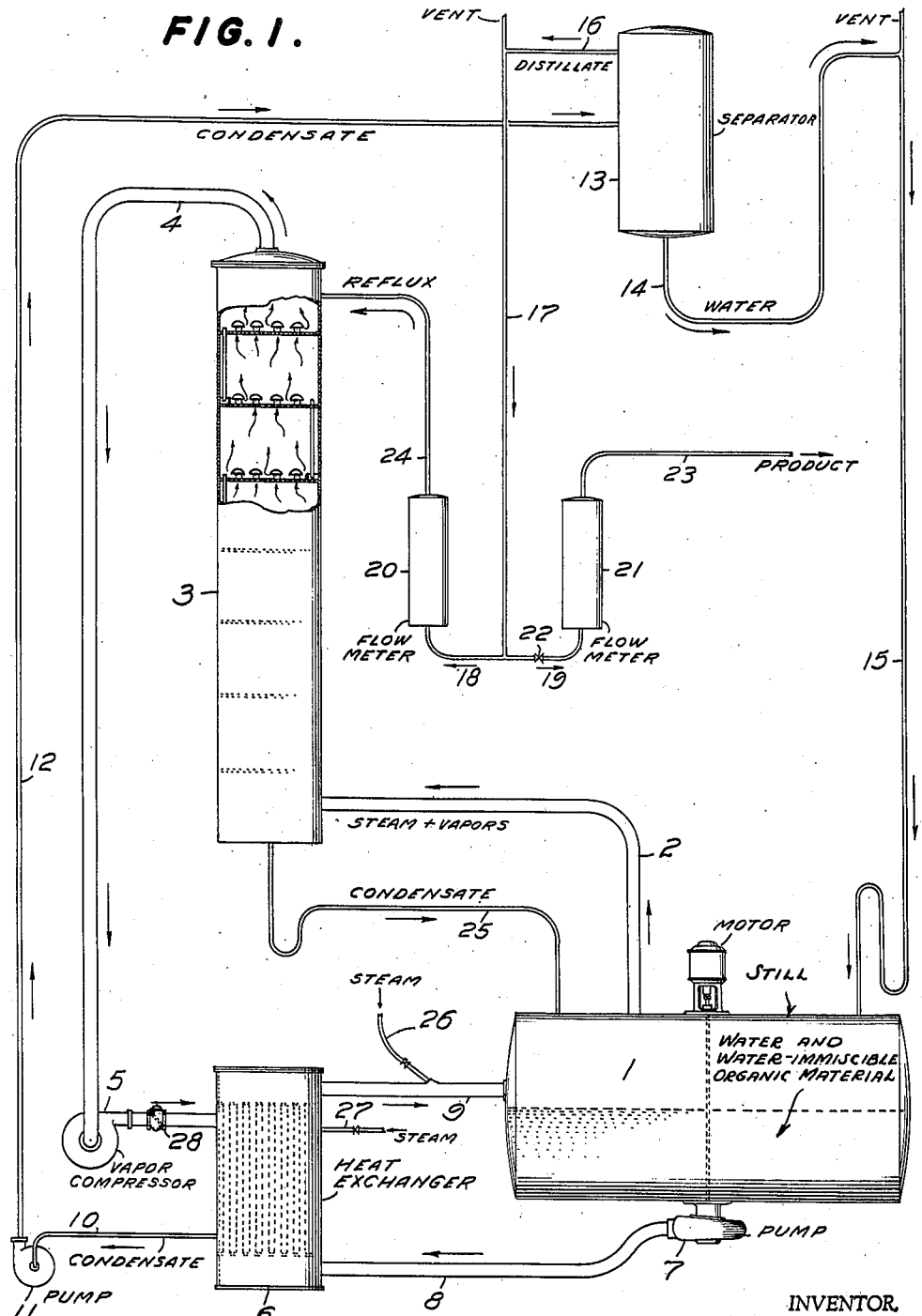

May 12, 1942. J. E. JEWETT 2,282,982
PROCESS OF STEAM FRACTIONATION
Filed May 26, 1939 3 Sheets-Sheet 1

Patented May 12, 1942

2,282,982

UNITED STATES PATENT OFFICE 2,282,982

PROCESS OF STEAM FRACTIONATION

Joseph E. Jewett, Larchmont, N. Y., assignor to American Cyanamid and Chemical Corporation, New York, N. Y., a corporation of Delaware Application May 26, 1939, Serial No. 275,804

1 Claim. (Cl. 202—72)

The present invention relates to fractionally separating terpenes, terpene alcohols and similar compounds. The invention also relates to processes for the heating of the contents of the still by means of the latent heat of vaporization given up in the condensation of the effluent vapors of the fractionating column in the steam fractionation of water-immiscible compounds.

It is common practice to fractionally distill terpenes in a vacuum in order to avoid decomposition and polymerization thereof which would occur at the higher distillation temperatures at atmospheric pressure. The practice of vacuum distillation however introduces the risk of attack on the terpenes during fractionation by air drawn into a fractionating column which is not air-tight. For example, it has been observed that air entering the fractionating column in the vacuum fractionation of sulfate turpentine for the separation of alpha-pinene, beta-pinene and dipentene therefrom, causes formation of insoluble resins therein which rapidly accumulate and cause stoppages in the vapor passages of the fractionating column. A further disadvantage in the vacuum fractionation of terpenes lies in the risk of oxidizing by air, which has leaked into the column, oxidizable terpenes such as alpha- and beta-pinene, dipentene, terpinolene and alpha- and beta-terpinene.

My invention therefore has as an object a process for the fractional separation of terpenes and similar compounds which are subject to attack by air under fractionating conditions, whereby leakage of air into the fractionating column during distillation may be avoided and reduced fractionating temperatures obtained.

This object of my invention may be accomplished by conducting the fractionation of the terpenes in an atmosphere of steam at a pressure in the fractionating column at least equal to that of the surrounding atmosphere. In this way, due to the absence of a pressure difference, air cannot leak into the fractionating column.

While the invention may be best practiced by using a pressure in the fractionating column which is at least equal to the pressure of the surrounding atmosphere, the column may be operated at a pressure slightly below atmospheric pressure and substantial prevention of air-leakage will be obtained.

The process of my invention is applicable, for example, to the separation of beta-pinene and dipentene from crude sulfate turpentine still residue, containing in addition thereto, terpene alcohols. In the recovery of alpha-pinene from sulfate turpentine, a by-product recovered from the blow-off gases of the digester in the sulfate process for pulping pine wood, a heads cut containing organic sulfur compounds is first distilled off and then the alpha-pinene cut distilled, whereby there is left in the still, a crude residue such as described above. This crude residue is not uniform in character and its constitution will vary according to the constituents of the crude sulfate turpentine and the extent of the removal of the alpha-pinene therefrom.

The invention may be used to separate other terpenes which are subject to attack by air under fractionating conditions where the partial pressures of the terpenes in an atmosphere of steam are of sufficiently different magnitudes to allow of their separation therein.

The second part of my invention has for its object the conservation of heat in a reduced temperature fractionating system.

In order to accomplish this object of my invention I have designed processes and apparatus whereby latent heat of vaporization given up in the condensation of effluent vapors from the steam fractionation of water-immiscible organic materials may be transferred to the contents of the still.

The operation of certain of these processes and apparatus is based on the principle that by compression of a vapor its temperature or heat level may be raised. In these vapor compression heating processes and apparatus of my invention, either the effluent vapors from the fractionating column of a steam fractionating process operated with a pressure in the column not below atmospheric pressure, or a secondary vapor generated by condensing these effluent vapors by indirect heat exchange with a vaporizable liquid, may be compressed to the degree necessary to elevate the condensing temperature thereof above the temperature of the contents of the still. The compressed vapor when brought into indirect heat exchange with the contents of the still will be condensed and the contents of the still heated by latent heat of vaporization given up by its condensation.

Vapor compression heating of the contents of the still of a normal boiling point or of a vacuum fractionating system is impracticable because of the large temperature differential between the vapors in the fractionating column top and the charge in the still, but with steam fractionation this temperature differential is reduced to a minimum and is made practically constant.

While this aspect of my invention is applicable to the fractionation of all water-immiscible organic materials it is particularly well suited to the fractionation of terpenes which are subject to attack by air under fractionating conditions since steam fractionation allows of the provision in the fractionating column of a pressure sufficient to prevent air leakage thereinto.

Figure 2:
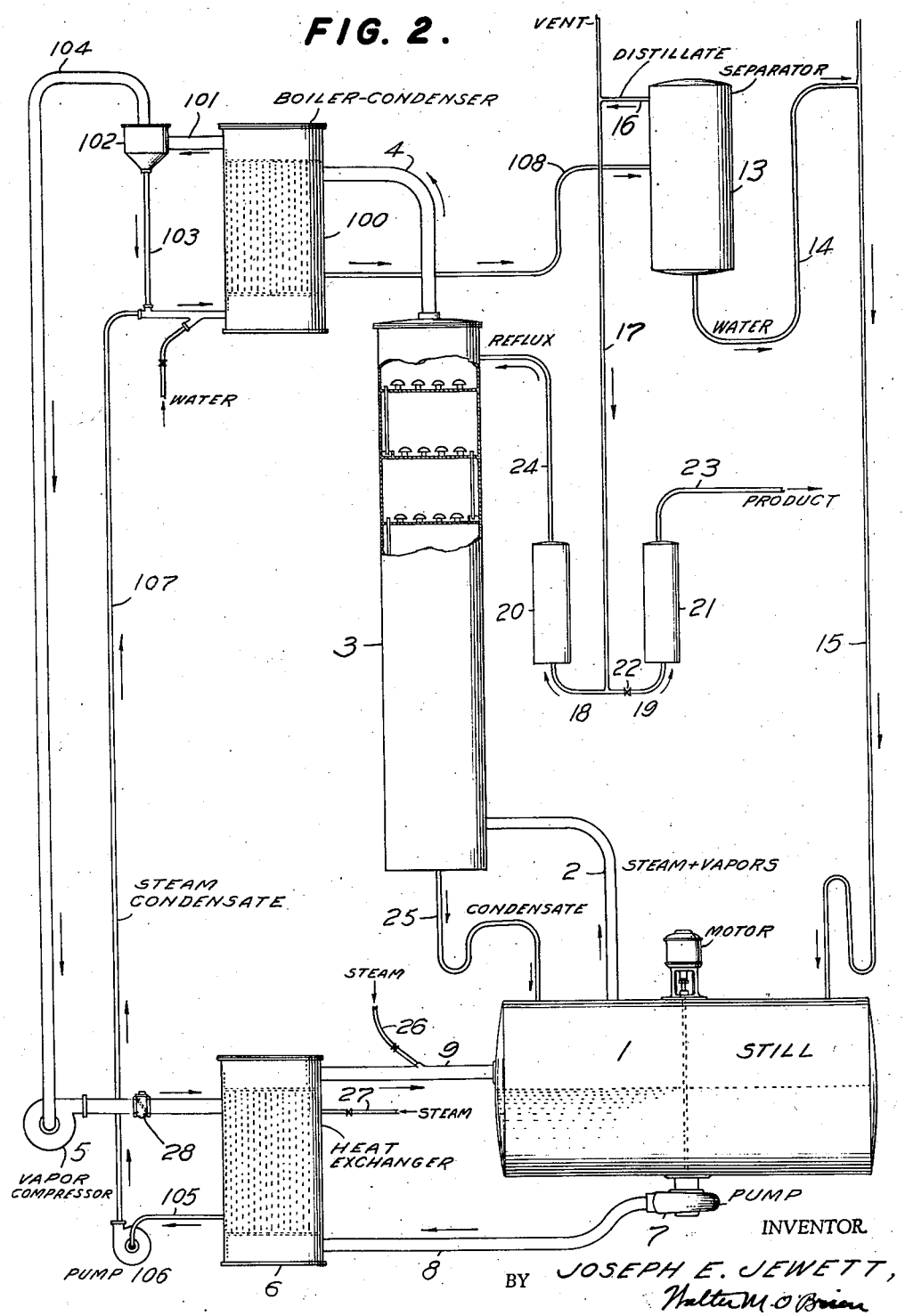
Figure 3:
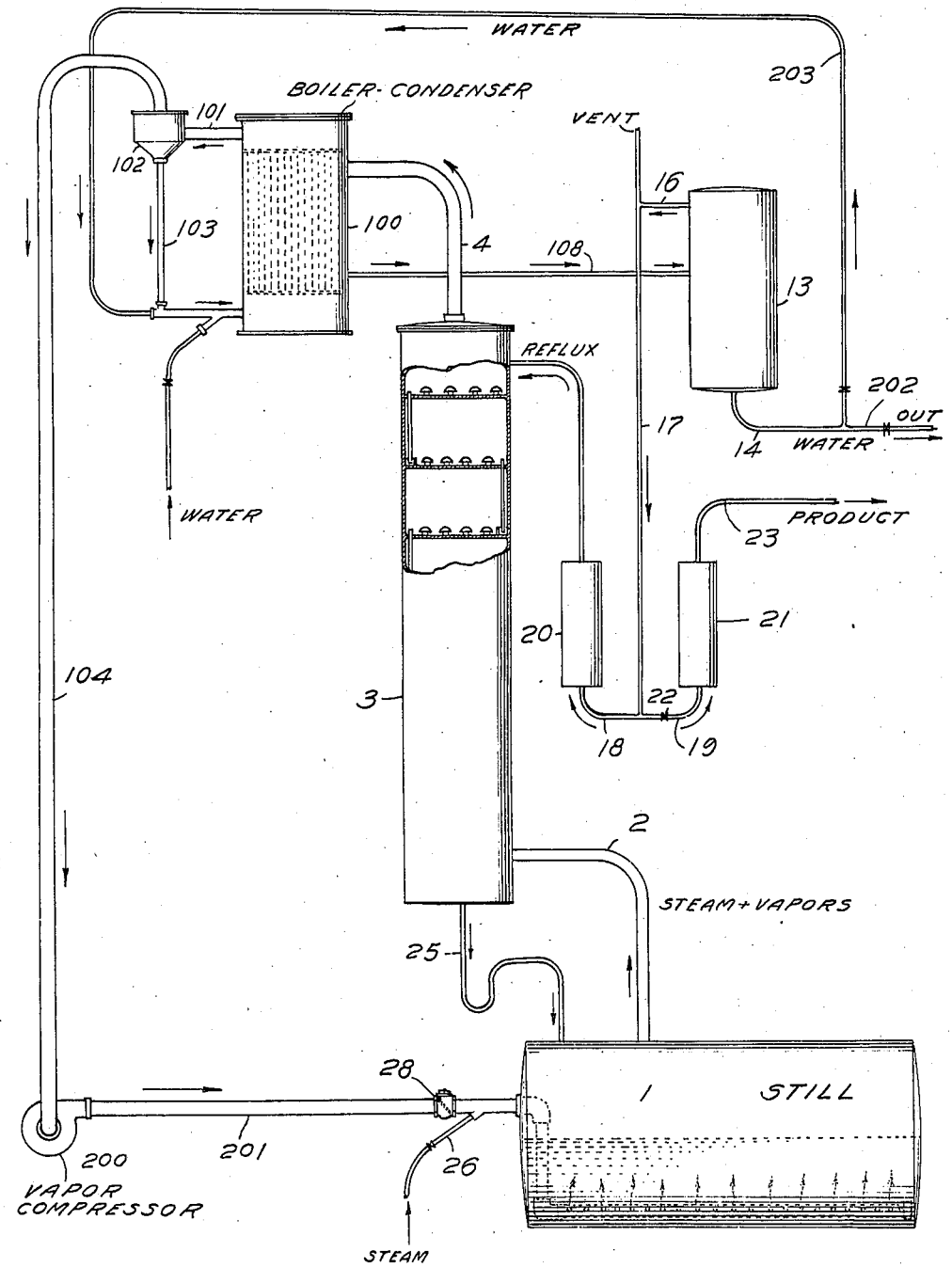

In the accompanying drawings are shown in diagrammatic form several modifications of apparatus designed, in accordance with my invention, for the carrying out of the several processes of this part of my invention, and in which:

Fig. 1 thereof is an apparatus designed for compression of the effluent vapors of the fractionating column and for bringing the compressed vapor into indirect heat exchange with the contents of the still;

Fig. 2 thereof is a modified design of apparatus for the generation of a secondary vapor from the heat of the effluent fractionating column vapors, compression of the secondary vapor, and for bringing the compressed secondary vapor into indirect heat exchange with the contents of the still; and Fig. 3 thereof is a modified design of apparatus for the generation of steam as secondary vapor and delivery of the steam into the still.

Referring to Fig. 1 the construction and operation of the apparatus shown therein for carrying out of one form of process is as follows. The water-immiscible organic material to be fractionally distilled, which may be the crude still residue described above, is fed along with a supply of water to the still 1 by any suitable means and the mixture therein heated to produce steam and components of the vapors to be fractionated, the mixed vapors passing through pipe 2 to the fractionating column 3 where they undergo the fractional separation in an atmosphere of steam. The fractionating column is sectional and of the bubble cap type, and lagged against heat loss therefrom. The effluent vapors leaving the fractionating column pass through the vapor line 4 to a vapor compressor 5 of any suitable construction, where they are compressed and their temperature raised to a point such that upon being brought into indirect heat exchange with the relatively cooler contents of the still they will be condensed. For example, if the temperature of the still contents is 105° C., which at this point may be mentioned as a suitable temperature for the fractional distillation of the crude still residue, then the effluent vapors may be compressed to produce a vapor temperature of about 110–115° C. which is sufficiently high to produce the necessary heat head between the compressed vapor and the liquid contents of the still to cause transfer of heat therebetween and condensation of the vapor. The compressed vapor is then brought into indirect heat exchange in heat exchanger 6 with the relatively cooler liquid charge of the still delivered to the heat exchanger by means of a pump 7 and feed line 8. The compressed vapor having a temperature high enough to allow of its condensation by the cooler contents of the still is condensed in the heat exchanger and in the condensation gives up latent heat of vaporization to the l'quid charge which is returned to the still through the pipe 9. The condensate in the heat exchanger is removed through pipe 10 to a pump 11, which will supply any force necessary in addition to the pressure on the condensate to elevate the condensate through line 12 to a liquid separator 13 for separation of the liquids therein by decantation. If the condensate be too hot for practical separation in the liquid separator it may be cooled by some suitable cooling means before it is introduced therein. Water is decanted from the separator through pipe 14 and returned to the still through connecting pipe 15. The distillate is withdrawn by pipe 16 and delivered by pipe 17 to branch pipes 18 and 19, connected for delivery of the distillate to flow meters such as Rotameters 20 and 21 respectively. The flow meters measure the amount of distillate constituting reflux and product respectively. Branch pipe 19 is provided with a valve 22 which controls the amount of distillate taken out of the system as product through pipe 23. That part of the distillate not removed as product is passed through line 18, flow meter 20 and feed line 24 to the top of the fractionating column to serve as reflux therein. Condensate from the fractionating column is returned to the still through pipe 25. The water losses of the system can be made up by injection of steam through pipe 26 into the contents of the still passing through return pipe 9.

To start up the fractionating apparatus the mixture of water and material to be distilled is circulated from the still by pump 7 and pipes 8 and 9 through the heat exchanger 6 to which steam is supplied by supply line 27, a check valve 28 in the vapor line operating to prevent passage of steam therethrough.

Referring to Fig. 2, this design of apparatus is for the carrying out of a modification of the above described process of heat recovery in a steam fractionation of water-immiscible organic materials where the nature of the effluent vapors from the fractionating column makes their passage through a compressor inadvisable. The construction and operation of this modified design of apparatus is as follows: The effluent vapors from the fractionating column 3 are brought into heat exchange with a vaporizable liquid in a boiler condenser 100, which is of the type wherein the heating medium, and in this case the hot effluent vapors from the fractionating column, pass around tubes containing the vaporizable liquid. The effluent vapors from the fractionating column as they pass around the tubes will be condensed by heat exchange with the vaporizable liquid therein and in condensing will give up latent heat of vaporization thereto, generating a vapor therefrom which will be termed secondary vapor. Where water is used in the tubes of the boiler condenser, as the vaporizable liquid, the secondary vapor will of course be steam. For convenience in description, the vaporizable liquid will be referred to in terms of water, and accordingly, the secondary vapor in terms of steam, although it will be understood that any suitable vaporizable liquid may be used in the boiler condenser in place of water. The steam generated in the boiler condenser is passed through a pipe 101 to a steam-water separator 102, the water which separates out returning through a pipe 103 to the tubes of the boiler condenser. The steam from the separator 102 is passed through a pipe 104 to the vapor compressor 5 where it is compressed to raise its temperature to a sufficiently high level that, upon being brought into heat exchange with the cooler contents of the still, it will be condensed thereby and latent heat of vaporization will be released for transfer to the contents of the still, which are circulated through the heat exchanger 6. The water resulting from the condensing of the steam in heat exchanger 6 is passed through a pipe 105 to a pump 106 which will supply any force necessary, in addition to the pressure on the condensate, to elevate the water through a pipe 107 to the tubes of the boiler condenser. The effluent vapors are passed as condensate from the boiler condenser through pipe 108 to the liquid separator 13.

In case the temperature of the effluent vapors from the fractionating column is below the normal boiling point of the water in the boiler condenser 100 there will be, of course, no generation of steam for delivery to the vapor compressor. This unbalance in the system will however be adjusted by the action of the vapor compressor, which, when no steam or an insufficient amount thereof is fed thereto, will act as an exhauster on the water tubes in the boiler condenser and produce a partial vacuum therein, lowering the boiling point of the water to a value sufficiently low to cause generation of steam therefrom. In order to avoid in this case, a vacuum in the fractionating column due to the condensation of the effluent vapors in the boiler condenser at the time when no, or an insufficient amount of vapor is being fed to the vapor compressor, which action would result in a heat deficiency in the still because of no heat recovery, steam may be injected into the heat exchanger 6 through a line 27 whereby heat is added to the still and the distillation rate increased. By increasing the rate of vapor generation in the still, the pressure in the column may be kept up to atmospheric pressure by the addition of the vapors fed thereto. The apparatus otherwise is operated in the manner described for the corresponding apparatus parts of Fig. 1.

Referring to Fig. 3, this design of apparatus is for the carrying out of a modified heat recovery process in a steam fractionation of materials. The construction and operation of this design of apparatus is as follows:

The effluent vapors from the fractionating column are passed around the water containing tubes of the boiler condenser 100, where in heat exchange with the water they are condensed, the condensate therefrom being passed to the separator 13, and the steam generated in the boiler condenser, after having passed through the steam-water separator 102, is compressed by a vapor compressor 200 to a pressure high enough to overcome the back pressure on the still 1, the steam under this pressure passing into the still through a pipe 201, the terminal portion of which is perforated for admission of the steam into the contents of the still. The water from the liquid separator 13 instead of being returned to the still may be either removed from the system by a line 202, in which case fresh water will be supplied to the boiler condenser, or may be sent in required amounts through a line 203 to the water tubes of the boiler condenser.

To start up this form of apparatus steam is injected through pipe 26 into the still until a sufficient volume of vapors are supplied from the fractionating tower 3 through pipe 4 to the boiler condenser 100, check valve 28 operating to prevent steam from passing into the vapor line. This pipe 26 will also serve to supply steam for making up heat and water losses in the system. The operation, otherwise, of this design of apparatus is the same as previously described for the corresponding apparatus parts in Figs. 1 and 2.

By operating the steam fractionation in accordance with any of the above procedures the amount of extraneous heat to be added to the fractionating system is limited to substantially the amount of heat loss therefrom. In some cases in the vapor compression heating processes the work done on the vapor by the compressor may make up all the heat loss from the system.

The above described embodiments of the several parts of my invention are given by way of illustration and not by way of limitation thereof except as included in the appended claim.

What I claim is:

The process of fractionally distilling water-immiscible organic materials which comprises, generating steam and vapors of the components to be distilled from a mixture of water and a water-immiscible organic material contained in a still, fractionating said components in said steam, condensing the effluent vapors from the fractionation by indirect heat exchange with a vaporizable liquid thereby generating a vapor from the latter, compressing this vapor, and, condensing it and transferring latent heat of vaporization therefrom to the contents of the still by passing the compressed vapor in heat exchange with the latter.

JOSEPH E. JEWETT.